(12) United States Patent
Kuhl

(10) Patent No.: US 11,378,111 B2
(45) Date of Patent: Jul. 5, 2022

(54) CLIP

(71) Applicant: Steven S. Kuhl, Hopkins, MN (US)

(72) Inventor: Steven S. Kuhl, Hopkins, MN (US)

( * ) Notice: Subject to any disclaimer, the term of this patent is extended or adjusted under 35 U.S.C. 154(b) by 198 days.

(21) Appl. No.: 16/807,031

(22) Filed: Mar. 2, 2020

(65) Prior Publication Data

US 2020/0200201 A1 Jun. 25, 2020

Related U.S. Application Data

(63) Continuation of application No. 29/635,493, filed on Jan. 31, 2018, now Pat. No. Des. 876,942.

(51) Int. Cl.
*F16B 2/22* (2006.01)
*F16B 7/22* (2006.01)

(52) U.S. Cl.
CPC .  *F16B 2/22* (2013.01); *F16B 7/22* (2013.01)

(58) Field of Classification Search
CPC .. F16B 2/245; F16B 2/241; F16B 2/22; Y10T 24/44769
See application file for complete search history.

(56) References Cited

U.S. PATENT DOCUMENTS

| | | | |
|---|---|---|---|
| 3,594,682 A * | 7/1971 | Oleson | H01R 4/643 439/100 |
| D222,430 S | 10/1971 | Millar | |
| 3,686,609 A * | 8/1972 | Hansen | H01R 11/24 439/92 |
| 3,858,370 A * | 1/1975 | Halstead | F16B 2/241 312/352 |
| D261,775 S | 11/1981 | Valigura | |
| 4,363,432 A | 12/1982 | Warthen | |
| D303,159 S | 8/1989 | Heath | |
| D317,252 S | 6/1991 | Rumpel | |
| D340,183 S | 10/1993 | Rumpel | |
| D350,216 S | 8/1994 | Heaton | |
| D354,677 S | 1/1995 | Troyer | |
| D370,559 S | 6/1996 | Arndt | |
| D393,923 S | 4/1998 | Dimonekas | |
| 5,987,714 A * | 11/1999 | Smith | F16B 5/0614 24/289 |
| 6,106,310 A * | 8/2000 | Davis | H01R 4/26 439/92 |
| D443,387 S | 6/2001 | Torres et al. | |
| D513,171 S | 12/2005 | Richardson | |
| D521,232 S | 5/2006 | Andre | |

(Continued)

OTHER PUBLICATIONS

King Electric; www.king-electric.com; SRK 13 Roof Clips Installation, Operation and Maintenance Instructions; accessed on Mar. 3, 2020; 2 pages.

(Continued)

*Primary Examiner* — Robert Sandy
(74) *Attorney, Agent, or Firm* — Merchant & Gould P.C.

(57) ABSTRACT

A clip includes a clip portion, a neck, and a hook portion. The clip portion includes a base arranged at the bottom side and having at least one tooth projecting from it, at least one clip arm connected to the base at a proximal end and having an opposite distal end spaced from the base and extending toward the rear end. A neck is connected to the clip portion and extends toward the front end. A hook portion is connected to the neck opposite the clip portion.

20 Claims, 9 Drawing Sheets

(56) References Cited

U.S. PATENT DOCUMENTS

| | | | |
|---|---|---|---|
| D526,743 S | 8/2006 | Battista, III et al. | |
| 7,568,250 B2 | 8/2009 | Menard-Flanagan | |
| D603,781 S | 11/2009 | Jimenez | |
| D603,898 S | 11/2009 | Rommel | |
| D653,940 S | 2/2012 | Yasher | |
| D670,159 S | 11/2012 | Bitarchas et al. | |
| D736,612 S | 8/2015 | Sickler, Jr. | |
| D738,713 S | 9/2015 | Volin | |
| D769,707 S | 10/2016 | Roentz | |
| D781,571 S | 3/2017 | Moerer | |
| D789,778 S | 6/2017 | White | |
| D806,529 S | 1/2018 | Olenick | |
| D811,869 S | 3/2018 | Gallion et al. | |
| D820,664 S | 6/2018 | Allen et al. | |
| 10,187,004 B2 * | 1/2019 | Rothschild | F24S 25/613 |
| D839,994 S | 2/2019 | Cole et al. | |
| D847,623 S | 5/2019 | Caron | |
| D861,471 S | 10/2019 | Ild | |

OTHER PUBLICATIONS

Rexel USA, A Rexel Group Company, Erico Caddy 812MB18 Combination Box/Conduit Hanger, Drop Wire/Rod/Beam, 1/2" or 3/4", www.rexelusa.com/...eam/Erico-Caddy-812MB18-Combination-Box-Conduit-Hanger%2C-Drop-Wire-Rod-Beam%2C-1-2%22-or-3-4%22/p/113318?prevPageNumber=2, site visited May 11, 2019.

* cited by examiner

CLIP

BACKGROUND

The present disclosure relates to a clip.

SUMMARY

In general terms, this disclosure is directed to a clip. In one possible configuration and by non-limiting example, the clip includes a clip portion, a neck, and a hook portion. Various aspects are described in this disclosure, which include, but are not limited to, the following aspects.

One aspect is a clip including a front end positioned opposite from a rear end and a top side positioned opposite from a bottom side, the clip comprising: a clip portion comprising: a base arranged at the bottom side and having at least one tooth projecting therefrom; and at least one clip arm connected to the base at a proximal end, and having an opposite distal end spaced from the base and extending toward the rear end; a neck connected to the clip portion that extends toward the front end; and a hook portion connected to the neck opposite the clip portion.

DETAILED DESCRIPTION

Figure 1:
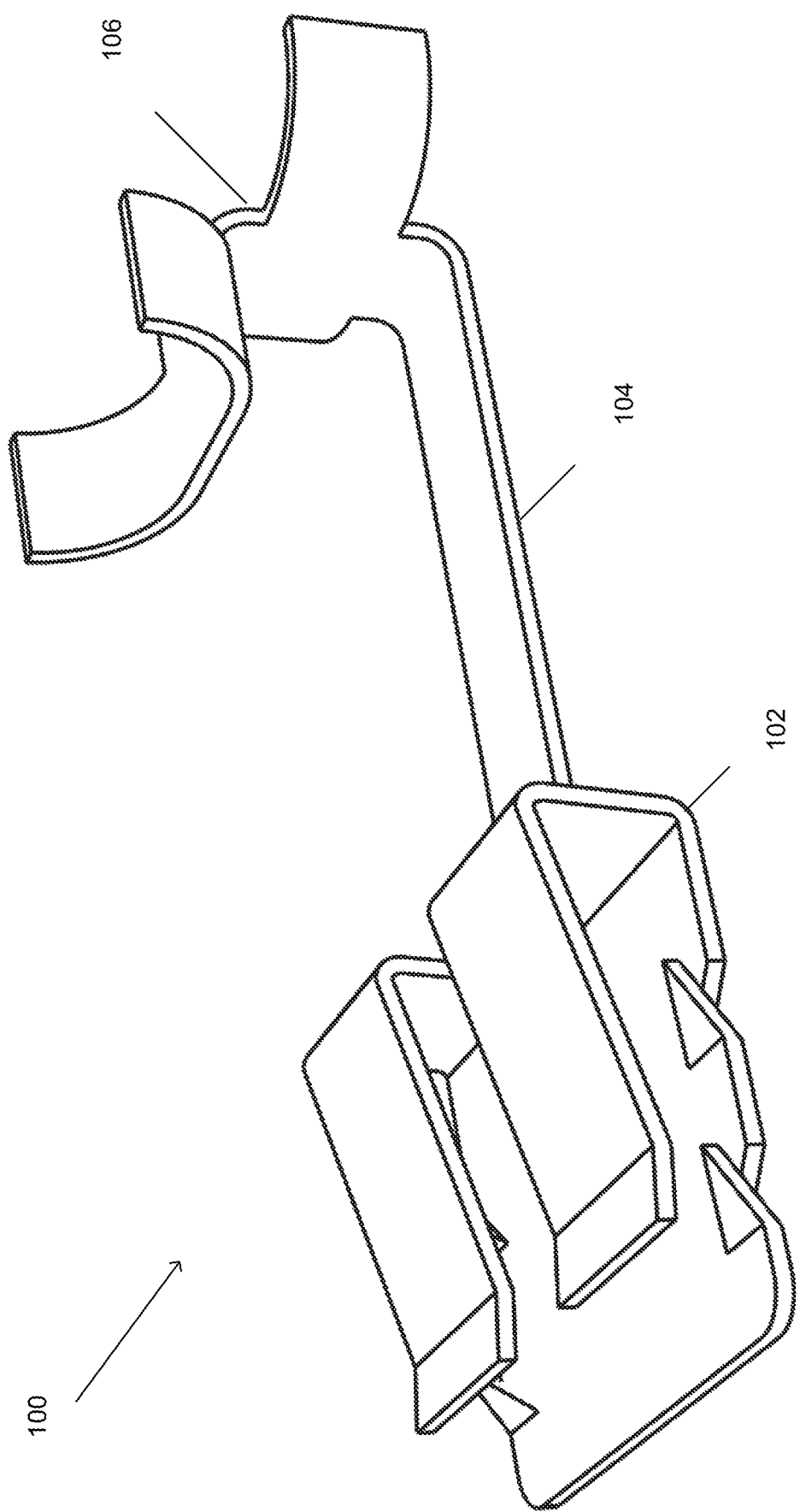
FIG. 1 is perspective view of an example clip.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a perspective view of an example clip 100. In this example, the clip 100 includes a clip portion 102, a neck 104, and a hook portion 106.

In this example, the clip portion is arranged at the rear end of the clip 100. The hook portion is arranged at the front end of the clip 100. The neck 104 connects to and extends between the clip portion 102 and the hook portion 106 of the clip 100.

Figure 2:
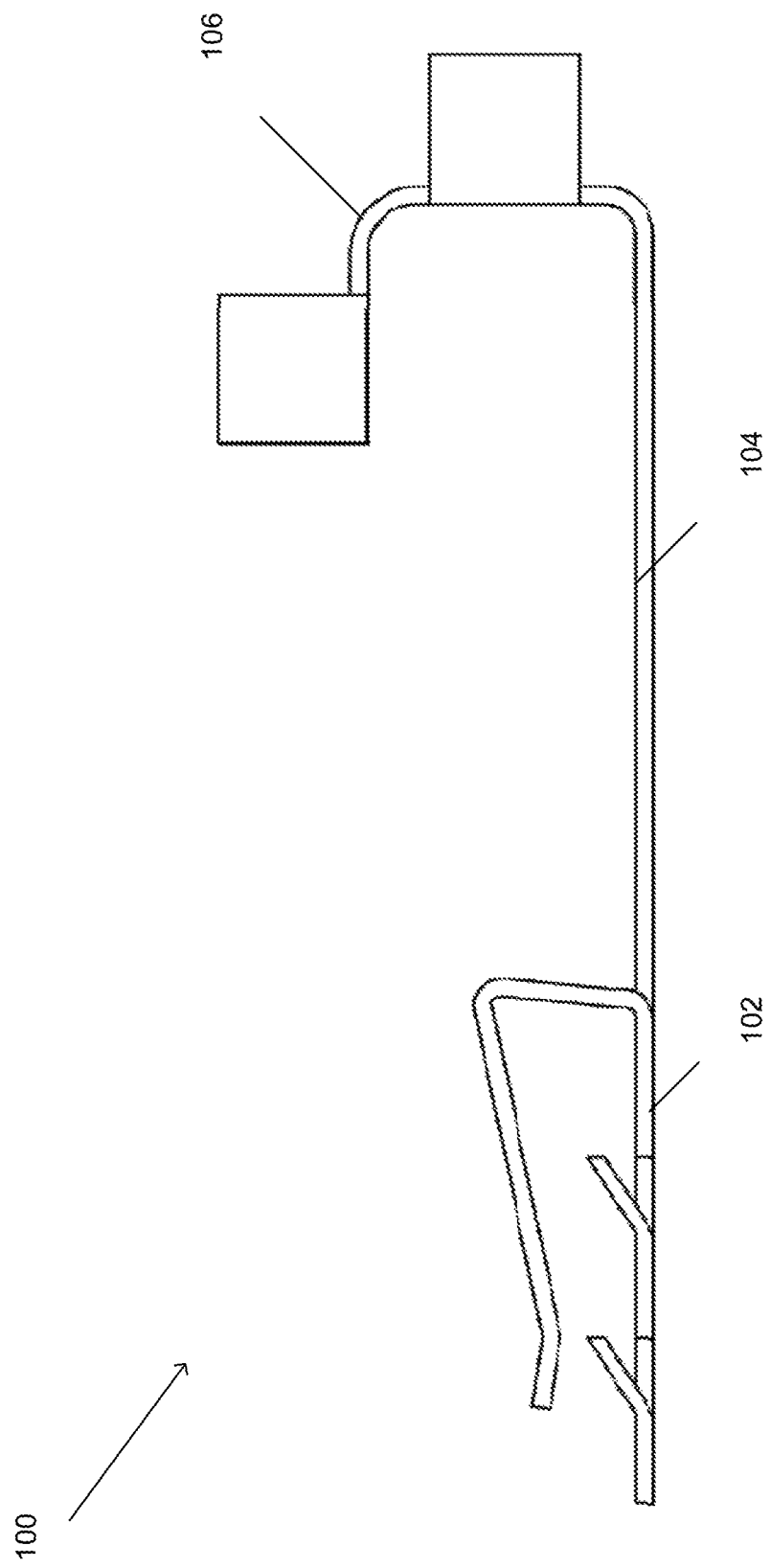
FIG. 2 is a right side view of another example of the clip.

FIG. 2 is a right side view of another example clip 100. In this example, the clip 100 includes a clip portion 102 at its rear end, a neck 104, and a hook portion 106 at its front end. The neck 104 connects to and extends between the clip portion 102 and the hook portion 106 of the clip 100.

Figure 3:
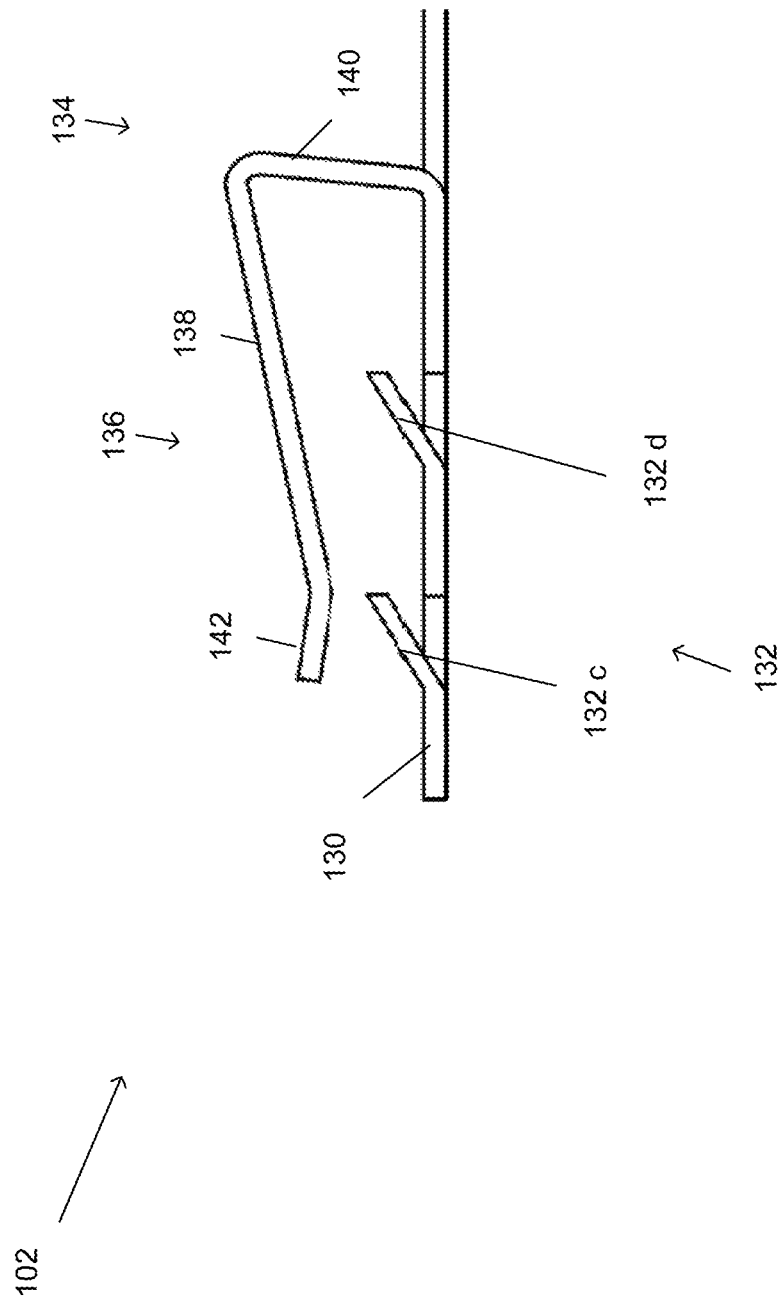
FIG. 3 is a right side view of an example clip portion of the example clip shown in FIG. 2.

FIG. 3 is a right side view of an example of the clip portion 102 of the example clip 100 shown FIG. 2. The example clip portion 102 includes a base 130, a clip arm 134, and at least one tooth 132 (including, for example, teeth 132a, 132b, 132c, and 132d, but only teeth 132c and 132d are visible in FIG. 3). The base 130 has a generally rectangular shape (shown more clearly in FIG. 5) and has a top and a bottom surface. The at least one tooth 132 protrudes from the base 130 and extends out from the top surface of the base 130 so that the pointed end terminates above the top surface of the base 130. The at least one tooth 132 is oriented so that the pointed end points in a topwardly and frontwardly direction.

Figure 4:
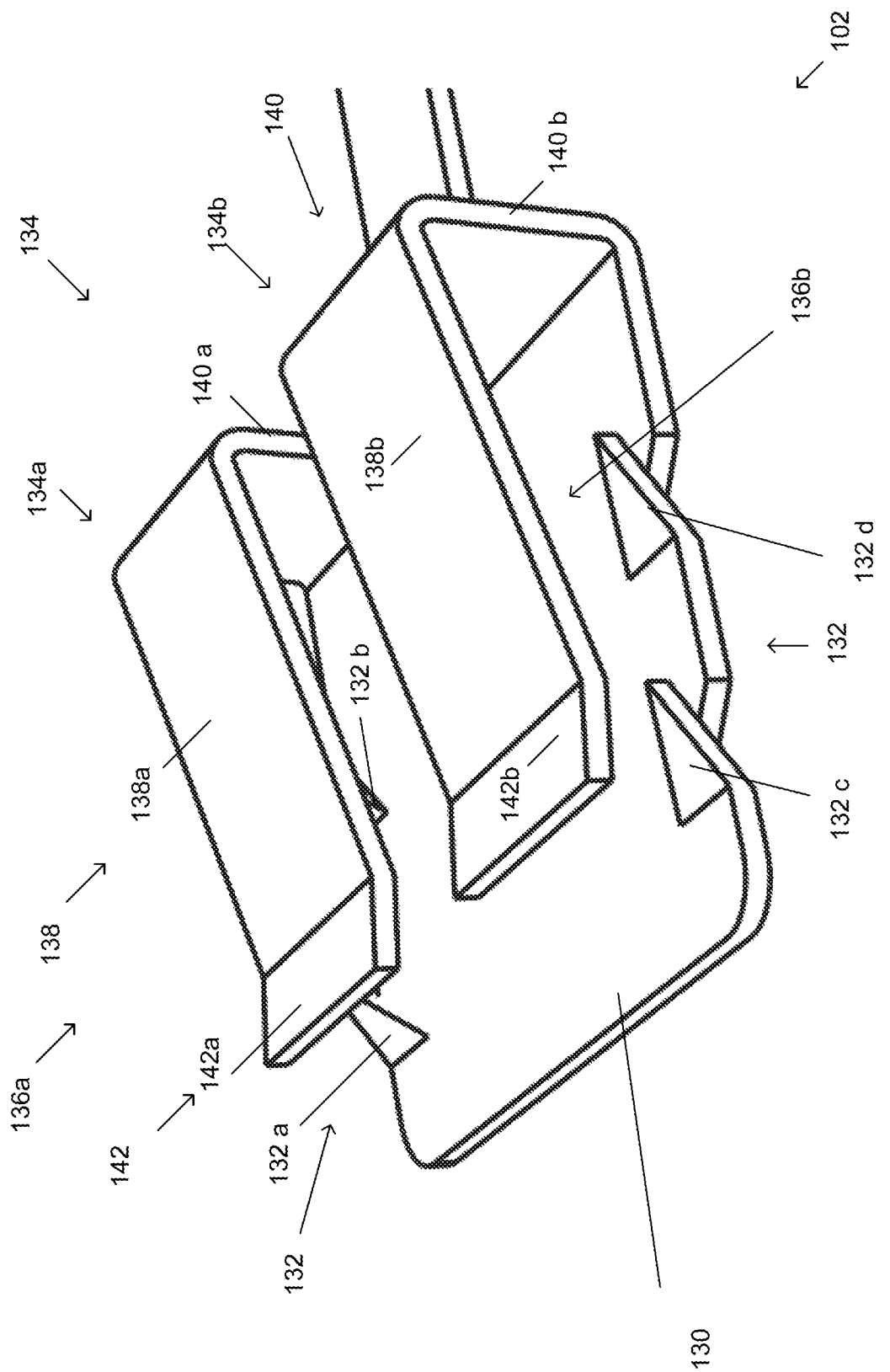
FIG. 4 is a perspective view of another example of the clip portion.
Figure 5:
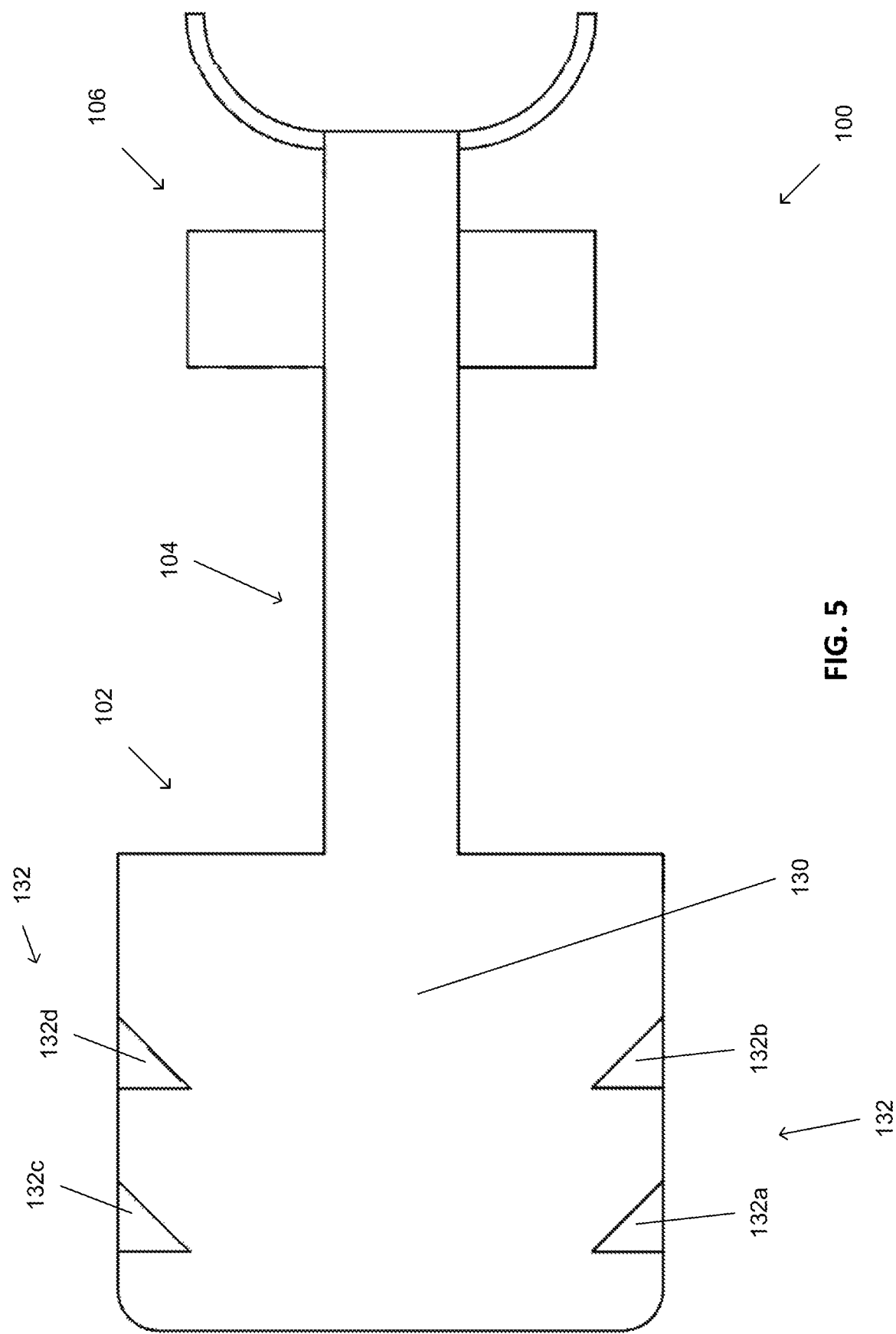
FIG. 5 is a bottom view of the example clip shown in FIG. 1.

FIGS. 4-5 illustrate additional views of the example clip 100 shown in FIG. 1. FIG. 4 is a perspective view of the clip portion 102. FIG. 5 is a bottom view of the example clip 100. Referring now to FIGS. 4 and 5, the teeth 132 are located at the far left and right sides of the base 130. A tooth 132a, 132b, 132c, 132d may be formed out of an angled cut into the left or right side of the base 130 in the rearwardly direction. The tooth 132a, 132b, 132c, 132d is bent to protrude out from the base 130 forming a crease running along a line from the furthest point of the angled cut into the base 130, out to the closest point on the left or right side of the base 130. Thus, the crease between the tooth 132a, 132b, 132c, 132d and the base 130 is parallel with the back edge of the base 130. In this example, the tooth 132a, 132b, 132c, 132d is oriented so that the one edge of the tooth 132a, 132b, 132c, 132d is formed from the side of the base 130 and the other edge of the tooth 132a, 132b, 132c, 132d is formed from the cut in the base 130.

Multiple teeth 132 may be located along the side of the base 130 so that one tooth 132c is located at a distance rearward of another tooth 132d. Additionally, teeth 132 may be located on both the left and right sides of the base 130 so that, for example, one tooth 132c is located to the right of another tooth 132a, and vice versa. Multiple teeth 132 may be located on both the left and the right sides of the base 130, so that one set of teeth 132b, 132d is located at a distance forward of another set of teeth 132a, 132c, Likewise, one set of teeth 132c, 132d, is located at a distance to the right of another set of teeth 132a, 132b. In this way, four teeth 132 (for example) may be located on the base 130 so that two teeth 132a, 132b are located on the left side of the base 130 and another two teeth 132c, 132d are located on the right side of the base 130.

Referring back to the example clip portion 102 shown in FIG. 3, the front end of the base 130 connects to an upwardly extending portion 140 of the clip arm 134. The clip arm 134 includes the upwardly extending portion 140 and a rearwardly extending portion 136. The upwardly extending portion 140 contains a front and back side and has a generally rectangular shape. The upwardly extending portion 140 extends in an upward and slightly frontward direction. At its uppermost point, the upwardly extending portion 140 connects to a downwardly extending component 138 of the rearwardly extending portion 136. The rearwardly extending portion includes the downward extending component 138 and an upwardly extending component 142. The downwardly extending component 138 may have a generally rectangular shape and extend in a rearward and downward direction. At its lowest point, the downwardly extending component 138 connects to the upwardly extending component 142. The upwardly extending component 142 can also have a generally rectangular shape and extends in a rearward and upward direction.

The downwardly extending component 138 has a length that is substantially greater than that of the upwardly extending component 142. Thus, the upwardly extending component 142 and downwardly extending component 138 of the rearwardly extending portion 136 are configured so that the uppermost point of the downwardly extending component 138, located at the connection point to the upwardly extending portion 140, is above the uppermost point of the upwardly extending component 142. Likewise, the lowest point of the rearwardly extending portion 136 is located at the connection point of the downwardly extending component 138 and the upwardly extending component 142.

The clip arm 134 may also be configured so that the rearwardly extending portion 136 of the clip arm 134 does not extend past the rear end of the base 130. The rearwardly extending portion 136 terminates at a position frontwardly from the rear end of the base 130. The clip arm 134 is further configured so that space is defined between the rearwardly extending portion 136 of the clip arm 134 and the base 130 of the clip. The teeth 132 are positioned below the rearwardly extending portion 136 of the clip arm 134 so that the teeth 132 extend into the space between the clip arm 134 and the base 130.

Referring now to FIG. 4, the clip portion 102 includes two clip arms 134. The clip arms 134a, 134b are positioned at the left and right sides of the base 130 and spaced apart from each other in the left/right direction. Another space is defined between the upwardly extending portions 140a, 140b and rearwardly extending portions 136a, 136b of the two clip arms 134a, 134b. The left side of the left clip arm 134a and the right side of the right clip arm 134b are positioned so that they are congruent with the respective left and right sides of the base 130 of the clip portion 102.

Figure 6:
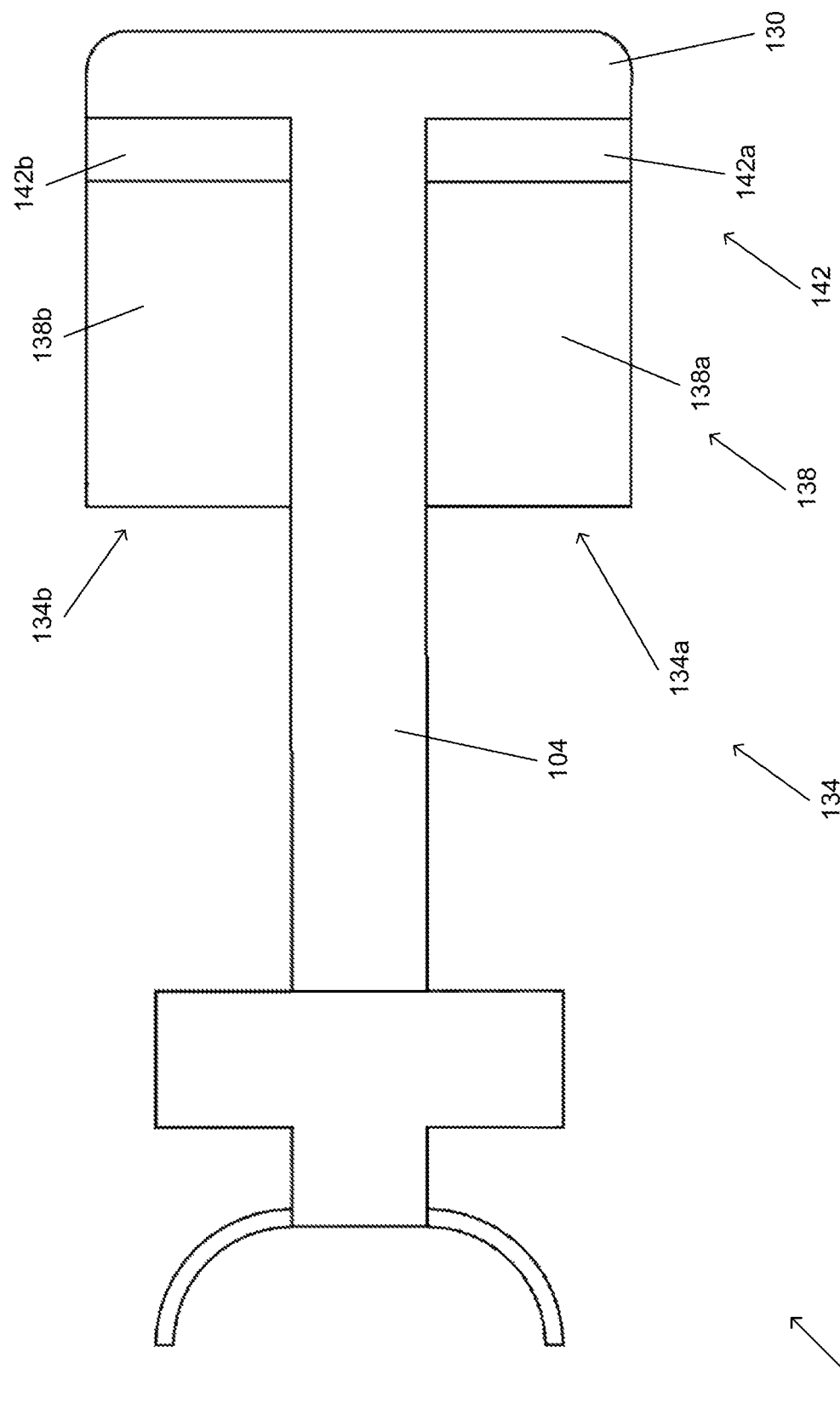
FIG. 6 is a top view of the example clip shown in FIG. 1.

FIG. 6 is a top view of the example clip 100 shown in FIG. 1. Referring now to FIGS. 4 and 6, in this example, the two clip arms 134a, 134b have an equal width in the left/right directions. The neck 104 connects to the front end of the base 130 and has a top and bottom surface. The neck is coplanar with the base 130. The neck 104 connects to the front end of the base 130 at the space between the two upwardly extending portions 140a, 140b of the clip arms 134a, 134b. The width of the neck 104 is equal to the width of the space between the two upwardly extending portions 140a, 140b of the clip arms 134a, 134b. The neck 104 extends frontwardly in a horizontal direction between the clip portion 102 and the hook portion 106. The neck 104 is coplanar with the base 130. Typically the frontwardly extending length of the neck 104 is substantially longer than the width of the neck 104 in the left/right direction.

Figure 7:
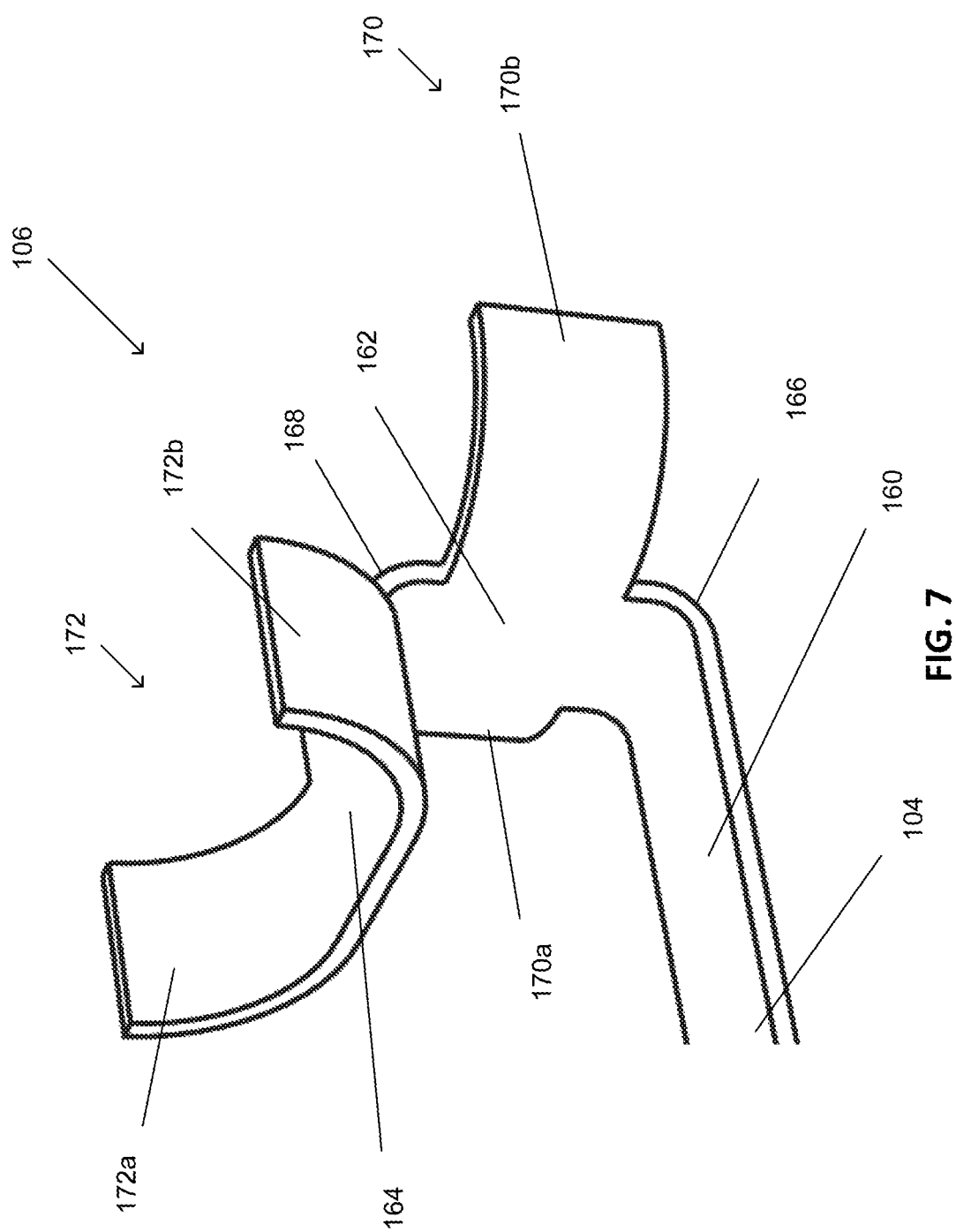
FIG. 7 is a perspective view of an example of the hook portion of the clip shown in FIG. 1.
Figure 8:
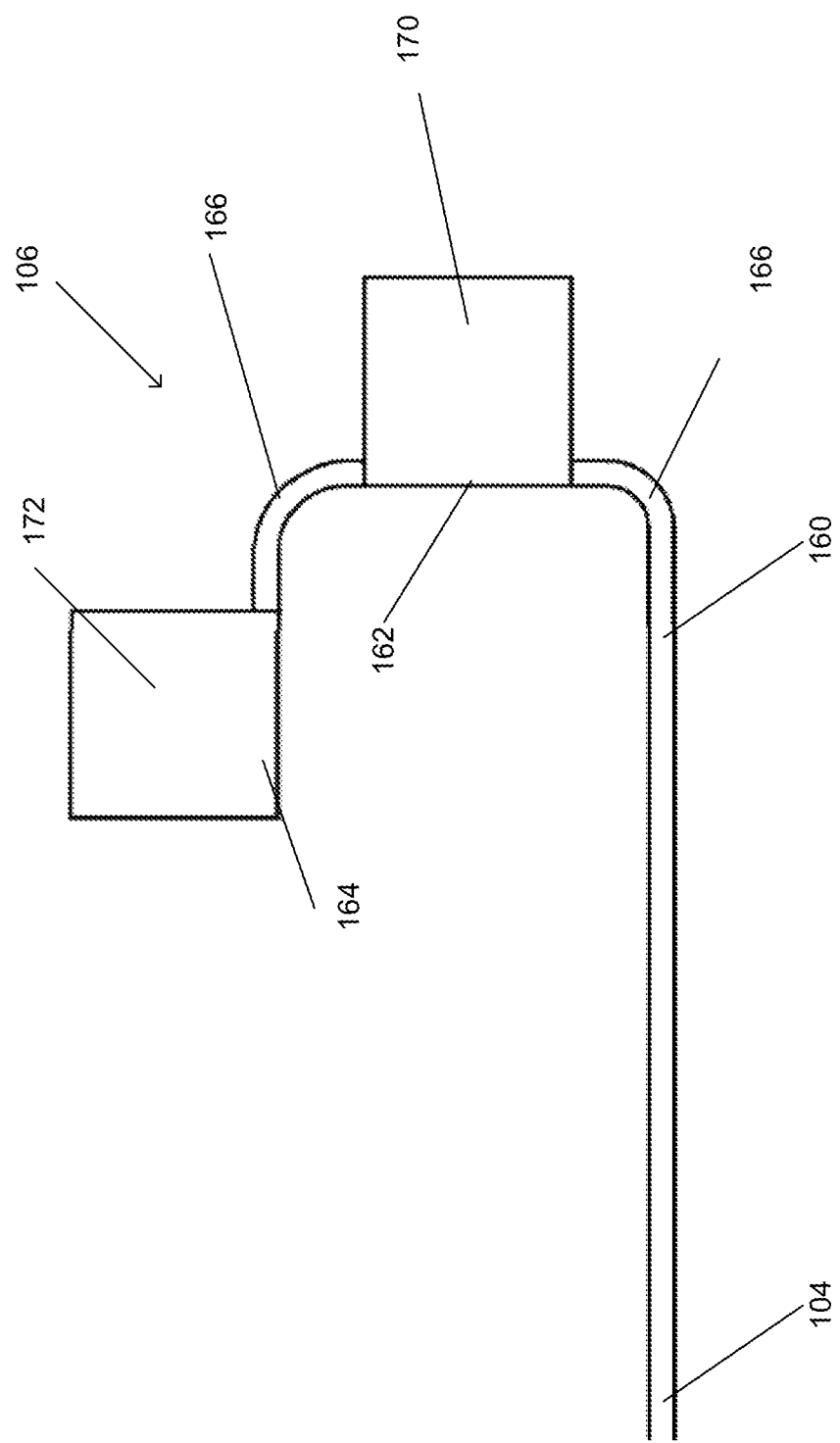
FIG. 8 is a right side view of another example of the hook portion of the clip of shown in FIG. 2.

FIGS. 7 and 8 illustrate examples of the hook portion 106 of the example clip shown in FIG. 1. FIG. 7 is a perspective view of the hook portion 106, and FIG. 8 is a right side view. As shown in FIGS. 7 and 8, the neck 104 connects at its other end (opposite the clip portion 102 discussed above) to the lower rearwardly extending arm 160 of the hook portion 106. In this example, the hook portion 106 includes the lower arm 160, a lower corner 166, an upwardly extending arm 162, an upper corner 168, an upper rearwardly extending arm 164, a first curved wing set 170, and a second curved wing set 172.

The neck 104 and the lower arm 160 are coplanar and have an equal width in the left/right direction. The lower arm 160 extends rearwardly toward the neck 104 in a horizontal direction and has an upper and lower surface. The neck 104 and the lower arm 160 are the same component.

At its frontmost end, the lower arm 160 connects to a horizontal end of the lower corner 166. The lower corner 166 and the lower arm 160 have an equal width in the left/right direction. The lower corner 166 has a curved shape so that its upper end is oriented vertically and connects to a lower end of the upwardly extending arm 162.

The upwardly extending arm 162 extends along its length upwardly in the vertical direction and includes a front and back surface. In one embodiment, the upwardly extending arm 162 has the same width as the lower corner 166 in the left/right direction. The upwardly extending arm 162 has a rectangular shape.

In one example, the first curved wing set 170 is positioned on the left and right sides of the upwardly extending arm 162. The first curved wing set 170 is positioned so that a first curved wing 170a has a length that protrudes leftwardly from the left side of the upwardly extending arm 162 and curves in a frontwardly direction (e.g., away from the clip portion 102). The second curved wing 170b of the first curved wing set 170 is positioned so that the second curved wing 170b has a length that protrudes rightwardly from the right side of the upwardly extending arm 162 and also curves in the frontwardly direction. The width of the wings 170a, 170b in the vertical direction is less than the length of the upwardly extending arm 162. The first curved wing set 170 may be further positioned so that it is centered along the length of the upwardly extending arm 162.

At its highest portion, the upwardly extending arm 162 connects to a vertical end of the upper corner 168. The upper corner 168 and the upwardly extending arm 162 have an equal width in the left/right direction. The upper corner 168 is curved so that its other end is oriented horizontally and connects to a horizontal end of the upper arm 164.

The upper arm 164 extends rearwardly in a horizontal direction and has an upper and lower surface. The upper corner 168 and the upper arm 164 have an equal width in the left/right direction. The upper arm 164 terminates at a horizontal position above the neck 104 and lower arm 160.

A second curved wing set 172 is positioned on the left and right sides of the upper arm 164. The second curved wing set 172 is positioned so that a first curved wing 172a has a length that protrudes leftwardly from the left side of the upper arm 164 and curves in an upwardly direction. The second curved wing 172b of the second curved wing set 172 is positioned so that the second curved wing 172b has a length that protrudes rightwardly from the right side of the upper arm 164 and curves in a upwardly direction. The width of the wings 172a, 172b in the horizontal direction is less than the length of the upper arm 164. The second curved wing set 172 may be positioned so that it is coincident with the rear edge of the upper arm 164.

Figure 9:
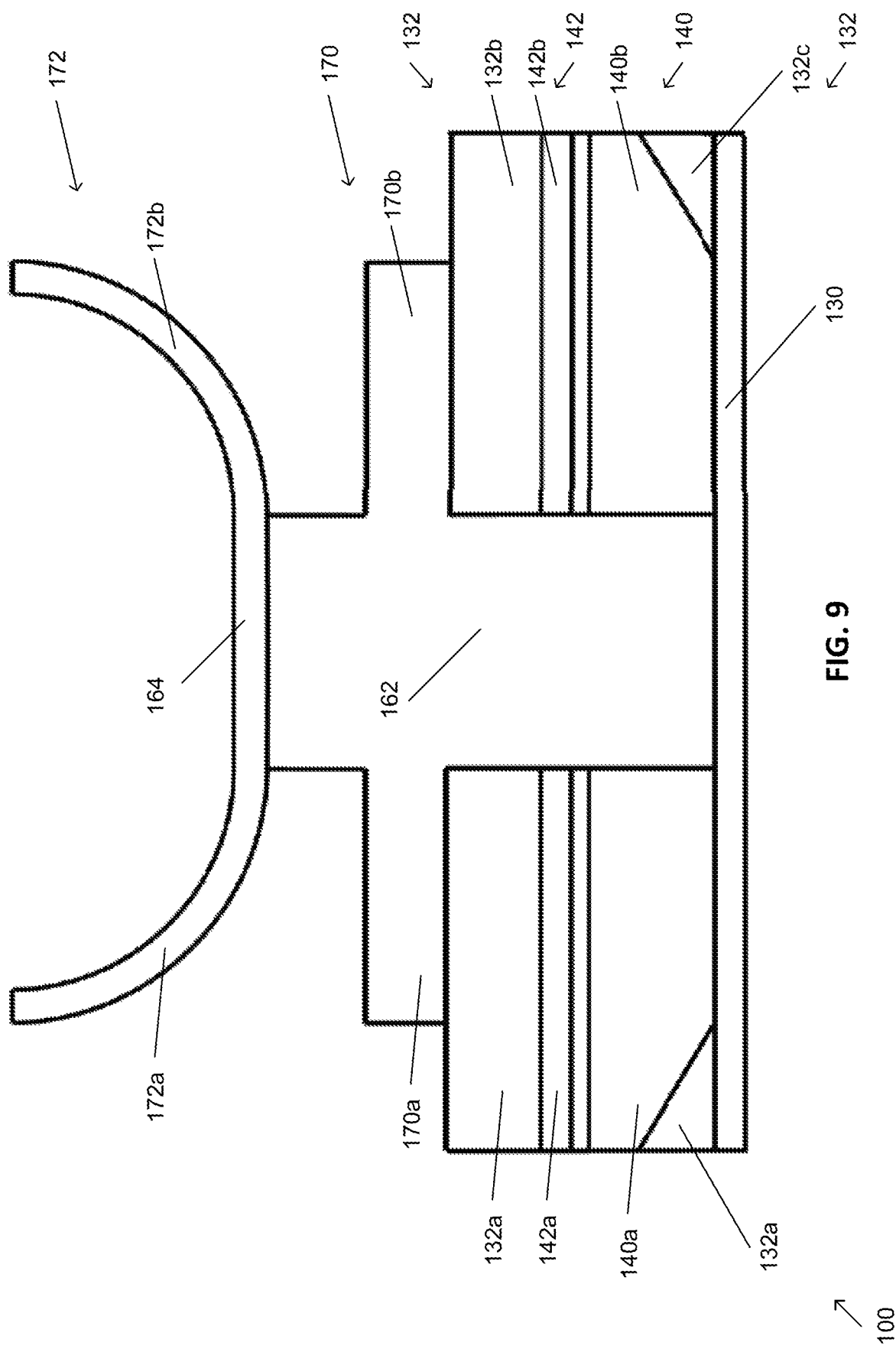
FIG. 9 is a rear view of the example clip shown in FIG. 1.

FIG. 9 is a rear view of the example clip 100 shown in FIG. 1. In this example, the wings 172a, 172b of the second curved wing set 172 terminate at a position where the wings 172a, 172b are extending in a vertical direction. Likewise, turning back to FIG. 6 the wings 170a, 170b of the first curved wing set 170 terminate at a position where the wings 170a, 170b are extending in a frontwardly direction.

The left side view of the clip 100 is a mirror image of the right side views shown herein.

What is claimed is:

1. A clip including a front end positioned opposite from a rear end and a top side positioned opposite from a bottom side, the clip comprising:
   a clip portion comprising:
      a base arranged at the bottom side and having at least one tooth projecting therefrom; and
      at least one clip arm connected to the base at a proximal end, and having an opposite distal end spaced from the base and extending toward the rear end;

a neck connected to the clip portion that extends toward the front end, wherein the base and the neck are coplanar; and a hook portion connected to the neck opposite the clip portion.

2. The clip of claim 1, wherein the at least one tooth projects into a space between the at least one clip arm and the base.

3. The clip of claim 2, wherein the at least one tooth projects in a direction both topwardly and frontwardly.

4. The clip of claim 1, wherein the base has a rectangular shape.

5. The clip of claim 1, wherein the clip portion includes two clip arms.

6. The clip of claim 5, wherein a left clip arm is positioned on a left side of the clip portion and a right clip arm is positioned on a right side of the clip portion.

7. The clip of claim 6, wherein the left clip arm is spaced from the right clip arm.

8. The clip of claim 7, wherein the clip portion includes four teeth projecting from the base, wherein two of the said four teeth are positioned beneath the left clip arm, and the other two of the said four teeth are positioned below the right clip arm.

9. The clip of claim 1, wherein the clip arm is bent at an angle in a direction extending towards the rear end of the clip portion.

10. The clip of claim 9, wherein the portion of the clip arm between the base and the bend defines a proximal portion, and wherein the portion of the clip arm between the distal end and the bend defines a distal portion, wherein said distal portion is oriented such that the distal portion is located closer to the base than the bend.

11. The clip of claim 1, wherein the hook portion includes an upwardly extending arm.

12. The clip of claim 11, wherein the hook portion includes an upper rearwardly extending arm connected to the upwardly extending arm at a corner.

13. The clip of claim 12, wherein the hook portion includes at least one wing set.

14. The clip of claim 13, wherein the at least one wing set is connected to the upwardly extending arm and curved in a direction away from the clip portion.

15. The clip of claim 14, wherein further comprising a second wing set connected to the rearwardly extending arm and curved in an upward direction away from the neck portion.

16. A clip including a front end positioned opposite from a rear end and a top side positioned opposite from a bottom side, the clip comprising:

a clip portion comprising:

a base arranged at the bottom side and having at least one tooth projecting therefrom; and at least one clip arm connected to the base at a proximal end, having an opposite distal end spaced from the base and extending toward the rear end, wherein the clip arm is bent at an angle in a direction extending towards the rear end of the clip, wherein the portion of the clip arm between the base and the bend defines a proximal portion, and the portion of the clip arm between the distal end and the bend defines a distal portion, the distal portion being oriented such that the distal portion is located closer to the base than the bend;

a neck connected to the clip portion that extends toward the front end; and a hook portion connected to the neck opposite the clip portion.

17. A clip including a front end positioned opposite from a rear end and a top side positioned opposite from a bottom side, the clip comprising:

a clip portion comprising:

a base arranged at the bottom side and having at least one tooth projecting therefrom; and at least one clip arm connected to the base at a proximal end, and having an opposite distal end spaced from the base and extending toward the rear end;

a neck connected to the clip portion that extends toward the front end; and a hook portion connected to the neck opposite the clip portion and including an upwardly extending arm and an upper rearwardly extending arm connected to the upwardly extending arm at a corner.

18. The clip of claim 17, wherein the hook portion includes at least one wing set.

19. The clip of claim 18, wherein the at least one wing set is connected to the upwardly extending arm and curved in a direction away from the clip portion.

20. The clip of claim 19, wherein further comprising a second wing set connected to the rearwardly extending arm and curved in an upward direction away from the neck portion.

* * * * *